United States Patent [19]
Creevy

[11] 3,768,634
[45] Oct. 30, 1973

[54] SYSTEM FOR HANDLING CLINICAL THERMOMETERS
[75] Inventor: Robert J. Creevy, Wilmette, Ill.
[73] Assignee: Xttrium Laboratories, Inc., Chicago, Ill.
[22] Filed: Dec. 10, 1971
[21] Appl. No.: 206,876

Related U.S. Application Data
[63] Continuation of Ser. No. 870,586, Nov. 5, 1969, abandoned, which is a continuation of Ser. No. 703,705, Feb. 7, 1968, abandoned.

[52] U.S. Cl...... 206/16.6, 206/DIG. 18, 248/205 A, 128/272
[51] Int. Cl...................... B65d 81/22, B65d 85/30
[58] Field of Search.................. 206/16.6, 16.5, 47, 206/DIG. 18; 215/100; 24/257; 248/205 R, 205 A; 259/72; 128/272

[56] References Cited
UNITED STATES PATENTS

| 307,761 | 11/1884 | Harger | 24/257 |
|---|---|---|---|
| 824,038 | 6/1906 | Myers | 206/16.6 |
| 1,614,807 | 1/1927 | Stewart | 206/16.5 |
| 1,919,811 | 7/1933 | Stonebraker | 206/16.5 |
| 2,744,649 | 5/1956 | Smith | 215/100 |
| 3,061,280 | 10/1962 | Kraft et al. | 259/72 |
| 3,283,894 | 11/1966 | Kafner et al. | 206/16.5 |
| 3,321,068 | 5/1967 | Beach | 206/16.5 |
| 3,338,390 | 8/1967 | Gordon | 206/16.5 |
| 3,495,698 | 2/1970 | Drawdt | 206/16.6 |

Primary Examiner—William T. Dixson, Jr.
Attorney—James P. Hume et al.

[57] ABSTRACT

A system for handling clinical thermometers of predetermined length comprising an open-mouthed vial precharged with a selected volume of microbiocidal solution and adapted to receive a clinical thermometer, a closure for selectively sealing the mouth of the vial, and attaching means for removably securing the precharged vial to a supporting surface so that the unsealed mouth of the vial is positioned to receive the thermometer. The volume of microbiocidal solution precharged into the vial is measured so that the displacement of the solution by the thermometer immerses the major length of the thermometer in the solution without overflowing the vial. In using one embodiment of the system, wherein the thermometer is packaged separately from the precharged vial, the attaching means is applied to a supporting surface at a desired location; the vial is removably secured to the attaching means with the mouth of the vial unsealed; and a clinical thermometer is then inserted into the vial through the unsealed mouth. The major portion of the thermometer is thereby immersed in the microbiocidal solution. In a second embodiment, the thermometer is furnished in the precharged vial and the vial is provided with a closure which seals the vial and maintains the thermometer firmly in the vial. In using this second embodiment, the vial is unsealed by dislodging the closure before securing the vial to the attaching means.

9 Claims, 19 Drawing Figures

SYSTEM FOR HANDLING CLINICAL THERMOMETERS

This application is a continuation application of application Ser. No. 870,586, filed Nov. 5, 1969 now abandoned, which is a continuation in part of application Ser. No. 703,705, filed Feb. 7, 1968 now abandoned.

BACKGROUND AND SUMMARY OF THE INVENTION

This invention relates generally to a system and method for handling clinical thermometers which assure that thermometers are maintained in a disinfected condition, and which permit a personal disinfected thermometer to be stored within easy reach of a patient.

The use of thermometers in large quantity in hospitals is obviously a necessity, since it is not unusual to take and record the temperature of a single patient two or three times within any 24 hour period. Accordingly, proper control over the system for handling, distributing and disinfecting clinical thermometers in hospitals and other large medical institutions is a matter of considerable concern. Such a system must meet rigid medical specifications to assure that the thermometers are disinfected before and after each use. Moreover, because of the large number of thermometers normally used in hospitals and the frequency of such use, the system must also be practical and economically feasible.

One common system for handling thermometers in medical institutions involves collection, disinfection and redistribution of the thermometers on a daily, or even a more frequent, basis. Such a system is undesirable from a clinical standpoint because there is no economically feasible way of assuring that the thermometers are disinfected, particularly when they are handled so often in large volume. Additionally, such a system could result in the transfer of bacteria or other infectious microorganisms from patient to patient, since it is unlikely that the same thermometer will be used continuously by the same patient. Additionally, such a mass-handling system for thermometers requires a substantial number of nurses or nurses' aides to collect, distribute, disinfect and redistribute the thermometers to the patients and is, therefore, uneconomical.

Because of the disadvantages inherent in the above-described mass-handling of thermometers in hospitals, there have been many attempts to provide systems which will assure that a single disinfected thermometer is used by the same patient continuously. Although some of the recent thermometer-handling systems are substantial improvements over the above-described old method of handling thermometers, a substantial amount of direct labor is still required to distribute and disinfect the thermometers.

To eliminate the above-noted problems and to especially minimize the need for direct labor, the thermometer-handling system in accordance with this invention provides a thermometer-supporting vial or receptacle which is precharged with a selected volume of microbiocidal solution. The system further provides an individualized thermometer of selected dimensions which can be immersed in the microbiocidal solution within the vial. Additionally, attaching means are provided which permit the vial and thermometer to be releasably mounted in an accessible position next to a patient's bed. Thus, the receptacle can be readily replaced at regularly specified intervals when the patient is undergoing a lengthy hospital stay or when the bed is being prepared for a new patient.

Briefly described, the thermometer-handling system in accordance with this invention comprises a hollow vial having a closed bottom and an open upper end or mouth which is precharged with a measured volume of suitable microbiocidal solution. Sealing means are provided for the mouth of the vial so that the vial can be sealed to keep the microbiocidal solution disinfected when the vial is not in use, such as during shipment and storage. The system further includes attaching means for releasably mounting the precharged vial to a supporting surface, such as a table or wall, within easy reach of a patient. The attaching means is adapted to be secured to the desired supporting surface and is further adapted to releasably grip the precharged vial in a manner which allows the vial to be easily mounted on or removed from the attaching means without removing the attaching means from the supporting surface. The system also includes a clinical thermometer which is dimensioned to extend within the vial. Preferably, a portion of the thermometer projects beyond the mouth of the vial so that the thermometer can be easily gripped and removed from the vial by a patient or nurse. In one embodiment of the system, the thermometers are provided separate from the vial, and can be immersed in the solution in the vial when the vial is put to use. In a second embodiment, the thermometers are provided in the sealed vial, already immersed in the microbiocidal solution.

When employing the thermometer-handling system in accordance with this invention, the attaching means is secured to a supporting surface such as a wall adjacent the bedside of a patient. The precharged vial is then unsealed and mounted in the attaching means. If the first embodiment is being used, the clinical thermometer is then inserted into the vial and displaces a predetermined portion of the microbiocidal solution contained in the vial. If the second embodiment is used, the unsealing of the vial exposes the top portion of the thermometer that is already immersed in the solution within the vial. By this process the thermometer is stored in the vial in a readily accessible position, with its major length immersed in the microbiocidal solution. The major length of the thermometer is thereby maintained in a disinfected condition by the action of the microbiocidal solution.

EXEMPLARY EMBODIMENTS

Additional features and advantages of the present invention will become apparent from the following description of exemplary embodiments thereof, taken in conjunction with the accompanying drawings, in which.

Referring generally to FIGS. 1-4 of the drawings, one embodiment of the thermometer-handling system in accordance with this invention includes a vial 10 provided with a removable cap 20 which has a measured charge of microbiocidal solution 30 contained therein. This embodiment of the system further includes attaching means 40 adapted to releasably grip the vial 10. Attaching means 40 is further adapted to be secured to a suitable supporting surface, such as a wall or table adjacent the patient's bed in the hospital, so that the precharged vial 10 can be mounted in a readily accessible position. Additionally, the system includes a clinical thermometer 50 which is provided separate from the vial 10 and which is dimensioned for subsequent insertion into the vial 10 in a manner which immerses the major length of the thermometer in the solution 30.

Figure 3:
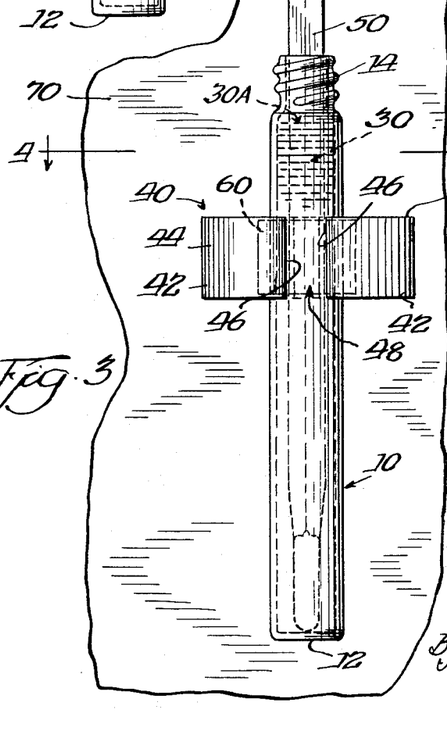
FIG. 3 is a front elevational view of the vial and attaching means illustrated in FIG. 2, showing the vial unsealed and secured within the attaching means, and further showing a clinical thermometer immersed in the microbiocidal solution within the vial.

Referring to FIGS. 1-4 in more detail, the vial 10 comprises an elongate tubular body which is preferably constructed of a transparent nonporous material such as glass or plastic. Thus, the amount of solution 30 contained within the vial 10 can be readily gauged by visual inspection, and the vial itself will not collect or trap bacteria. A bottom wall 12 closes the lowermost part of the vial 10 and defines a supporting surface which will engage with the lower end of the thermometer 50 when the thermometer is placed within the vial (FIG. 3). In the illustrated embodiment, the top portion of the vial 10 includes a threaded portion 14 which engages with the removable screw cap 20. The cap 20 operates to completely seal the open mouth of the vial 10 so that the solution 30 in the vial is maintained in a disinfected condition during shipment or storage of the vials, prior to use in the system.

Figures 1, 2:
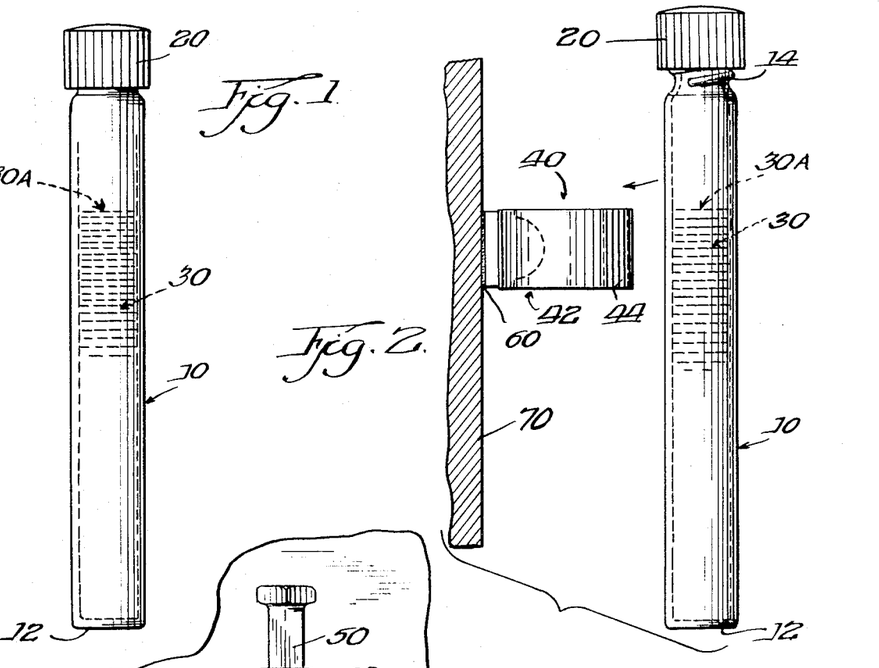
FIG. 1 is an elevational view of one embodiment of this invention, showing one form of precharged vial which may be employed in the system.
FIG. 2 is a side elevational view of the precharged vial illustrated in FIG. 1, showing the vial in association with one form of attaching means for releasably gripping the vial, to thereby mount the vial on a supporting surface.
Figure 4:
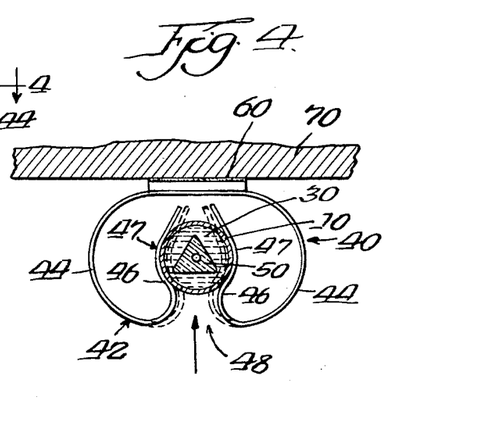
FIG. 4 is a cross-sectional view taken along the line 4—4 in FIG. 3.

As seen from FIGS. 2 and 4, one form of the attaching means 40 includes a mounting bracket 42 for gripping and supporting the vial 10. The mounting bracket 42 comprises a spring clip having resilient side arms 44 which are return-bent at their centers to form resilient central wings 46. As shown in FIG. 4, the wings 46 are spaced to form an opening 48 therebetween, and define concave recesses 47 adapted to receive the vial 10. Accordingly, the vial 10 can be forcefully inserted into the opening 48 of the bracket 42 in the direction indicated by the arrow in FIG. 4. The force on the vial 10 will spread the resilient wings 46 so that the vial can seat within the recess 47. The vial 10 is thereby releasably mounted on the bracket 42 by the gripping action of the resilient wings 46 on the exterior of the vial.

Further, the rearward portion of the bracket 42 is provided with a suitable fastening means to secure the bracket 42 to the desired supporting surface, such as to the wall 70 illustrated schematically in FIGS. 2 and 4. In the form illustrated in FIGS. 1-4, the fastening means comprises a strip of pressure sensitive adhesive material 60. The adhesive strip 60 is preferably provided with a removable protective sheet (not shown), so that the adhesive material will not be exposed to the atmosphere prior to the attachment of the mounting bracket 42 to the desired supporting surface.

The clinical thermometer 50 may be of any suitable form. However, the width of the thermometer 50 used in the system in accordance with this invention is selected so that the thermometer can be readily inserted within the vial 10. Moreover, the length of the thermometer 50 is selected so that the top portion of the thermometer will extend outside of the vial 10 when the lower end of the thermometer engages with the bottom portion 12. By this arrangement, the major length of the thermometer 50 is immersed in and disinfected by the microbiocidal solution 30 contained within the vial 10. This arrangement also allows the top portion of the thermometer to be easily gripped to remove the thermometer from the vial 10.

To initiate the use of the embodiment of the thermometer-handling system as illustrated in FIGS. 1-4, the hospital or other medical institution is supplied with thermometer sets including the sealed vials 10, which are precharged with a measured volume of microbiocidal solution 30, the clinical thermometer 50 and a corresponding number of attaching means 40. When a thermometer is dispensed to a patient, the bracket 42 is secured to the desired supporting surface near the patient's bed, such as the wall 70, by means of the pressure sensitive adhesive strip 60. Then one of the precharged vials 10 is inserted through the bracket throat 48 into the bracket recesses 47, as illustrated in FIG. 4. In the preferred method, the cap 20 is loosened, such as illustrated in FIG. 2, before the vial 10 is placed in the bracket 42. By taking such a step, the vial 10 can be inserted in the bracket 42 without the danger of spilling a part of the solution 30 from the vial. Thereafter the cap 20 is completely removed, and the thermometer 50 is inserted in the vial 10 until the thermometer comes to rest on the bottom wall 12 of the vial, such as illustrated in FIG. 3. As the thermometer 50 is inserted in the vial 10 in such fashion, a portion of the solution 30 in the vial is displaced upwardly, and the surface 30A of the solution 30 is raised from a normal position, shown in FIG. 1, to an elevated position in the vial 10, as shown in FIG. 3. Th major length of the thermometer 50 is thereby immersed within the microbiocidal solution.

Figures 5, 6, 7, 8, 9, 10:
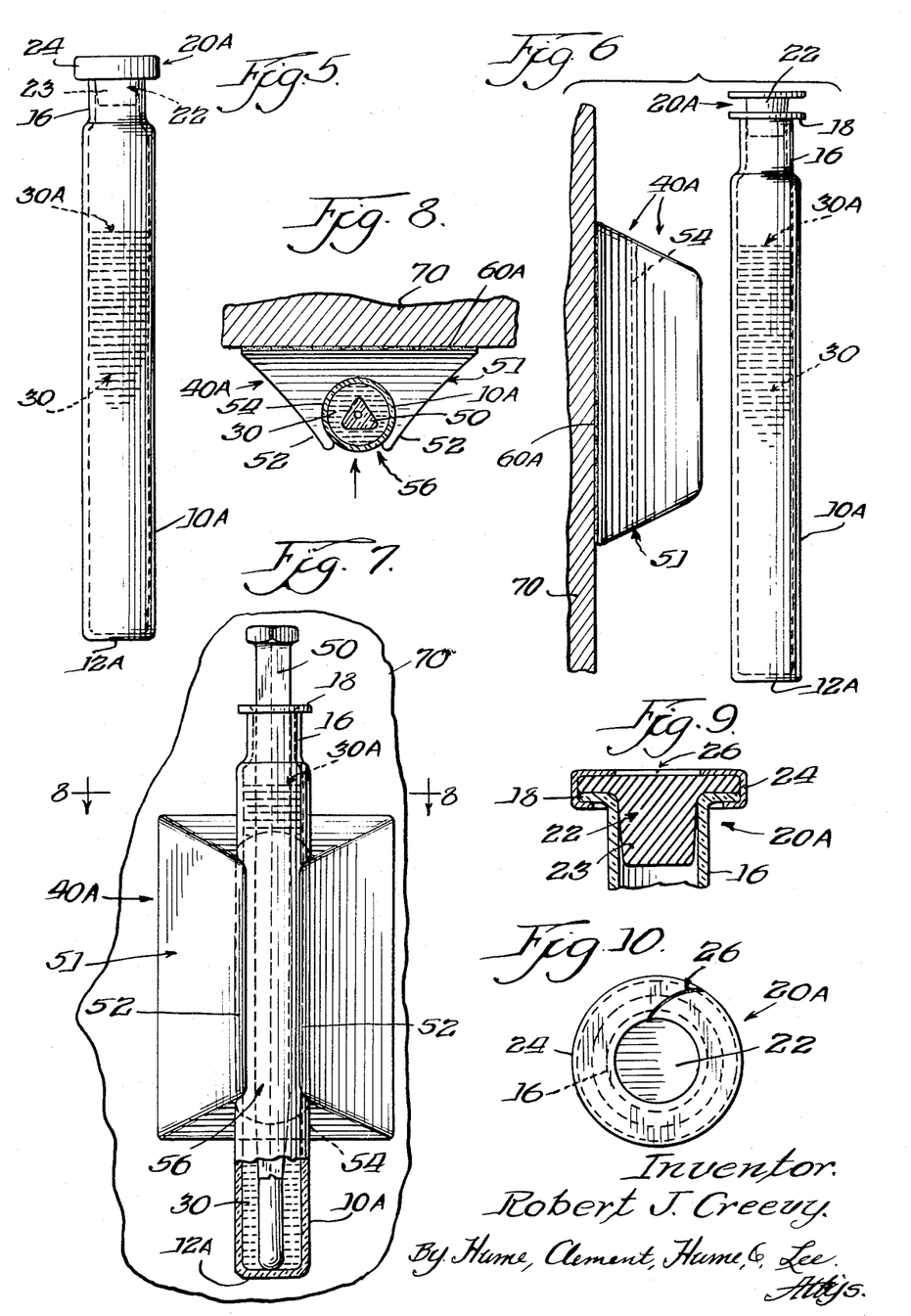
FIG. 5 is an elevational view of a second form of precharged vial which may be employed in the system in accordance with the present invention.
FIG. 6 is a side elevational view of the precharged vial illustrated in FIG. 5, showing the vial in association with a second form of attaching means for releasably gripping the vial, to thereby mount the vial on a supporting surface.
FIG. 7 is a front elevational view of the vial and attaching means illustrated in FIG. 6, showing the vial unsealed and secured within the attaching means, and further showing a clinical thermometer immersed in the solution within the vial.
FIG. 8 is a cross-sectional view taken along the line 8—8 of FIG. 7.
FIG. 9 is an enlarged cross-sectional view of the sealing means included in the second form of vial, as illustrated in FIG. 5.
FIG. 10 is an elevational view of the sealing means illustrated in FIG. 9.

FIGS. 5-10 illustrate a modified vial 10A and a modified attaching means 40A which can be employed in the system in accordance with the present invention. The vial 10A also comprises an elongate tubular body constructed from a transparent and nonporous material such as glass or plastic. Further, the vial 10A includes a bottom wall 12A which defines a supporting surface for the thermometer 50 when the thermometer is placed in the vial, as illustrated in FIG. 7.

In contrast to the above-described vial 10, the modified vial 10A is provided at its upper end with a restricted neck portion 16 and the mouth of the vial includes a transverse flange 18. By this arrangement the above-described screw cap 20 can be eliminated, and the mouth of the vial 10A can be sealed by a sealing means 20A of the type commonly known as an injectable vial finish. As seen from FIGS. 9 and 10, the sealing means 20A comprises a flexible stopper 22 made from a suitable elastomeric material. The top portion of the stopper 22 defines a circular flange for engaging the flange 18 of the vial 10A, as seen in FIG. 9. Additionally, the lower end of the stopper 22 defines a tapered plug 23 which is dimensioned to seal the mouth of the vial 10A, as also seen in FIG. 9. Further, a band of sealing material 24 such as aluminum is crimped around the upper portion of the stopper 22 and the vial flange 18 to assure that the mouth of the vial 10A is completely sealed. A score line 26, as illustrated in FIG. 10, is provided in the band of sealing material 24 to facilitate the removal of the band when the vial 10A is being prepared for use.

FIGS. 6-8 illustrate a modified form of attaching means 40A. In contrast to the metallic spring clip 40, illustrated in FIGS. 2-4, the modified attaching means 40A comprises an integral body 51 composed of a flexible nonskid elastomeric or plastic material. The front portion of the body 51 is formed to define a pair of opposed resilient side arms 52, and the central portion of the body 51 is formed to define an elongate central bore 54. As shown in FIG. 8, the side arms 52 are spaced apart to provide an elongate opening 56 in communication with the bore 54. The bore 54 and side arms 52 are dimensioned so that the flexible body 51 will engage with and grip the exterior of the vial 10A throughout the length of the bore.

As illustrated in FIGS. 6 and 7, the body 51 is preferably elongate in configuration so that the bore 54 and side arms 52 are of substantial length with respect to the length of the vial 10A. This configuration allows a substantial portion of the nonskid body 51 to contact the vial 10A to securely retain the vial within the attaching means 40A. Moreover, such elongate configuration provides the body 51 with a substantial back surface for receiving suitable fastening means, such as a strip of pressure-sensitive adhesive material 60A, for securing the body 51 to a supporting surface such as wall 70. Due to the substantial back surface of the body 51, the adhesive strip 60A will engage with the wall 70 over a large contact area and will thereby securely mount the body 51 on the wall 70.

The clinical thermometer 50 is dimensioned so that it can be readily received within the vial 10A for immersion within the microbiocidal solution 30. Moreover, the length of the thermometer is selected so that the top portion will extend above the mouth of the vial 10A when the lower end of the thermometer engages with the bottom wall 12A, as illustrated in FIG. 7. As mentioned above, this arrangement allows the top portion of the thermometer to be easily gripped, and also allows the major length of the thermometer 50 to be immersed in and disinfected by the microbiocidal solution 30 contained within the vial 10A.

An embodiment of the thermometer-handling system including the modified vial 10A and modified attaching means 40A is used in substantially the same manner as set forth above. The hospital or other medical institution is supplied with thermometer sets including the sealed vials 10A which are precharged with a measured volume of microbiocidal solution 30. The thermometer sets also include a clinical thermometer 50 and a corresponding number of attaching means 40A. When a thermometer is dispensed to a patient, the body 51 of the attaching means 40A is secured to a supporting surface (wall 70) near the patient's bed by means of the pressure-sensitive adhesive strip 60A. Then one of the precharged vials 10A is selected and is unsealed by removing the sealing material 24. In the preferred method of use, the stopper 22 is initially raised only part way out of the mouth of the vial 10A to a position illustrated in FIG. 6, so that the stopper continues to seal the vial. Thereafter the vial 10A is inserted into the bore 54 of the body 51 by either forcing the vial through the opening 56, in the direction indicated by the arrow in FIG. 8, or by sliding the vial downwardly into the bore in the direction indicated by the arrow in FIG. 6. The latter method for mounting the vial 10A in the body 51 is preferred, since it has been found that the vial can be readily inserted into the bore 54 by such method without flexing the side arms 52 any substantial amount. Thus, the side arms 52 will be subjected to less wear, and the useful life of the attaching means 40A will be prolonged. The vial 10A can be readily removed from the bore 54 by pulling the vial outwardly through the opening 56.

After the vial 10A is positioned in the bore 54 and thereby gripped by the body 51, the stopper 22 is completely removed and the thermometer 50 is inserted in the vial until the thermometer comes to rest on the bottom wall 12A (FIG. 7). During the insertion of the thermometer 50 in such fashion, a portion of the solution 30 contained in the vial is displaced upwardly, and the surface 30A of the solution is raised from a level shown in FIG. 5 to a higher level, such as illustrated in FIG. 7. By this step a major length of the thermometer 50 is immersed and maintained in a disinfected condition in the microbiocidal solution 30.

FIGS. 11-19 of the drawings illustrate a second embodiment of the thermometer-handling system in accordance with this invention. In this second embodiment, the clinical thermometer is supplied within the precharged vial and is sealed within the vial in a manner which immerses the major portion of the thermometer in the microbiocidal solution. This scond embodiment therefore has the additional advantage of eliminating the labor necessary to ship and store the clinical thermometer separately from the vial, and to insert the thermometers in the vial when the system is put into use.

The systems illustrated in FIGS. 11-13 and 16-19 utilize the above-described vial 10, including the threaded upper portion 14 and are thereby adapted for use with a threaded closure member. The system illustrated in FIGS. 14 and 15 utilizes the vial 10A, as described above, provided with an upper flange portion 18 and is adapted for use with a frictional closure member 130. These modifications, as illustrated in FIGS. 11-19, employ suitable attaching means 40A, such as the above-described flexible body 51 for securing the vials 10 or 10A to a supporting surface in a readily accessible position. Also, both vials 10 and 10A, as illustrated in FIGS. 11-19, are precharged with a measured volume of microbiocidal solution 30 and are adapted to receive a clinical thermometer 50 or 50A. As described above, the clinical thermometer has a predetermined width and length which permit the thermometer to be readily inserted in the vials 10 or 10A, so that the top portion of the thermometer extends above the vial when the lower end engages with the bottom portion 12 of the vial. Moreover, the volume of the microbiocidal solution 30 is selected so that the placement of the thermometer 50 or 50A inside the vials 10 or 10A immerses the major portion of the thermometer in the solution, but does not cause the solution to overflow the vial.

Figures 11, 12, 13, 14, 15:
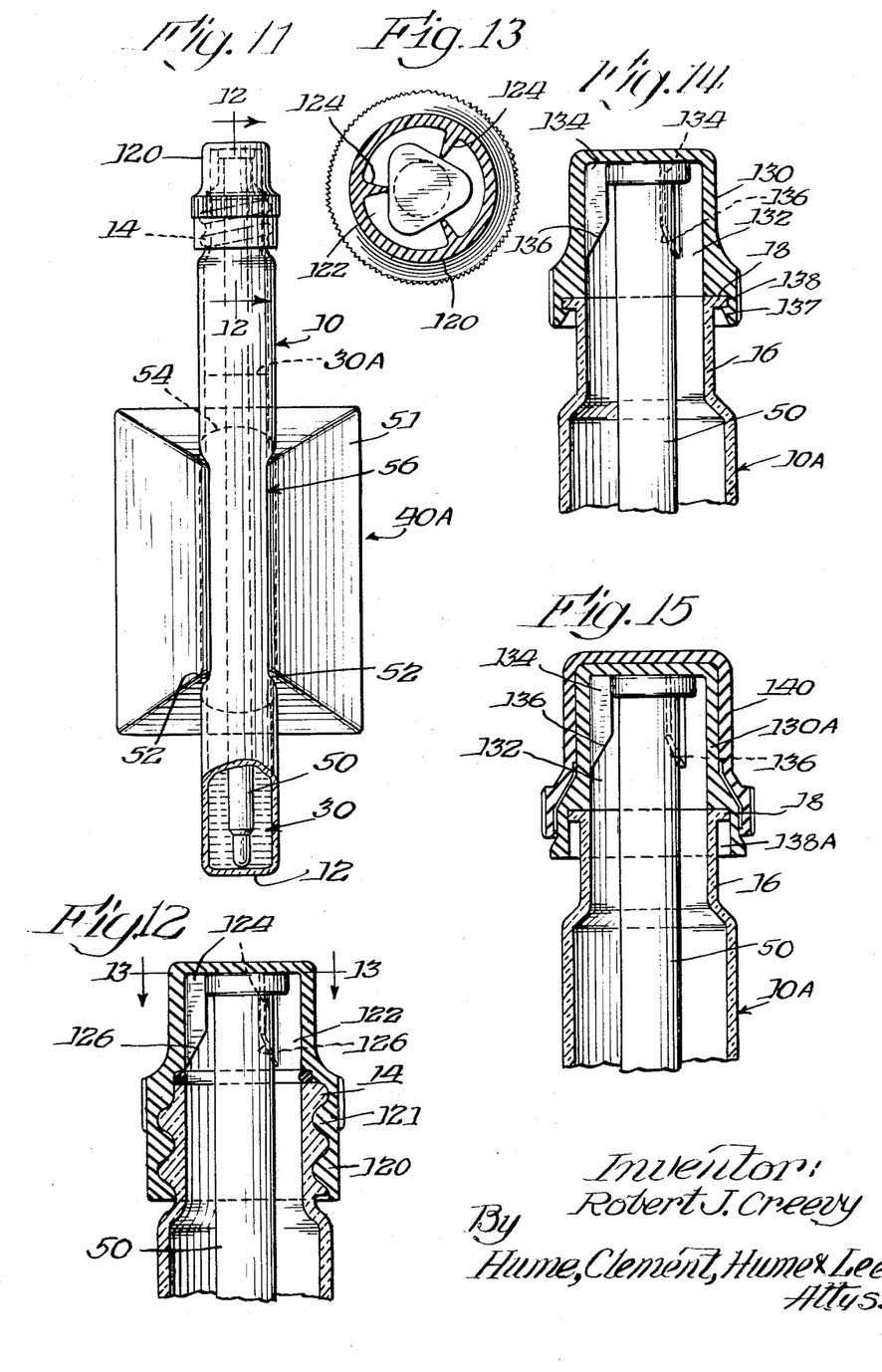
FIG. 11 is a front elevational view of a second embodiment of the system in accordance with this invention wherein the thermometer is packaged within the precharged vial, showing one form of closure for sealing the vial and maintaining the thermometer firmly in place within the vial.
FIG. 12 is an enlarged partial cross-sectional view of the vial and closure, taken along the line 12—12 in FIG. 11.
FIG. 13 is a cross-sectional view of the closure taken along the line 13—13 in FIG. 12.
FIG. 14 is an enlarged cross-sectional view of a modified vial and closure which can be utilized in the second embodiment of the system in accordance with this invention.
FIG. 15 is an enlarged cross-sectional view of the vial shown in FIG. 14, showing a further modification of the closure for the vial.

The cap 120 illustrated in FIGS. 11 and 12 includes threads 121 which engage with the threaded portion 14 on the vial 10 to thereby seal the open mouth of the vial 10. The solution 30 is thus maintained in a disinfected condition during shipment or storage. The cap 120 is also provided with an elongate recess portion 122 which extends for a predetermined distance above the open end of the vial 10. The depth of the recess 122 is selected so that the cap 120 firmly engages the upper end of the thermometer 50 when the thermometer is supported on the bottom wall 12 of the vial 10, and the cap 120 is threaded onto the threaded portion 14 of the vial 10. By this arrangement, the cap 120 will prevent any substantial longitudinal movement of the thermometer 50 within the vial 10.

The cap 120 is further provided with means to secure the thermometer 50 from lateral movement in the vial 10 during storage and shipment. In this connection, the cap 120 includes a plurality of deformable abutment members 124 which are adapted to engage with the top end of the thermometer 50. As illustrated in FIGS. 12 and 13, the abutments 124 are preferably integral with the cap 120 and are spaced uniformly around the interior of the cap recess 122. The lower end of each of the abutments 124 includes an upwardly beveled edge 126, as illustrated in FIG. 12 to facilitate the insertion of the cap 120 over the top of the thermometer 50. The beveled edges 126 also aid in centering the thermometer within the vial.

FIG. 14 illustrates a modified vial cap 130 which performs the same functions as the cap 120, but which is adapted for use with the modified vial 10A. The modified cap 130 also includes an elongate recess 132 which is dimensioned so that the cap firmly engages with the top end of the thermometer 50 and maintains the thermometer against the bottom wall 12 of the vial 10A. The cap 130 also includes deformable abutments 134 provided with beveled lower edges 136. Like the previously described abutments 124, the abutments 134 are uniformly spaced around the interior recess 132 of the cap and frictionally engage with the thermometer 50 as the cap 130 is secured to the vial 10A. The cap 130 will thereby seal the vial 10A and maintain the thermometer 50 in a central position within the vial.

The cap 130 also includes means for frictionally securing the cap to the flange 16 of the vial 10A. To accomplish this, the cap 130 preferably is made from deformable elastomeric material, such as plastic or rubber and has a lower recessed ring portion 137. As indicated in FIG. 14, the ring 137 is beveled inwardly and terminates in an enlarged annular groove 138. The groove 138 is dimensioned to firmly grip the flange 18 on the vial 10A. By this arrangement, the flange 18 can be fed into the ring 137 and snapped into the groove 138. The resiliency of the cap 130 then will frictionally maintain the cap sealed against the vial flange 18.

FIG. 15 illustrates a modified cap assembly for use with the flanged vial 10A. In the modified cap 130A used in this assembly, the groove 138A is extended to the lower end of the cap and is dimensioned to frictionally receive the vial flange 18. This arrangement eliminates the beveled ring 137 as provided on the cap 130 (FIG. 14) and permits the cap 130A to be secured to and removed from the flange 18 more readily than the cap 130. The cap 130A also includes the above-described deformable abutment members 134, having beveled edges 136 for securing the thermometer 50 from lateral movement within the vial 10A.

The modified cap 130A further includes an overcap 140 dimensioned to nest with the resilient cap 130A. The overcap 140 is made from a less resilient material than the cap 130A and is adapted to urge the cap 130A inwardly so that the flange 18 of the vial 10 is firmly gripped by the cap 130A. The overcap 140 therefore can be used to maintain the vial 10A in a sealed condition when the system is being stored or shipped. Then, when the vial 10A is to be put into use, the overcap 140 can be removed from the cap 130A to unseal the vial 10A, and the cap 130A thereafter can be used to seal the vial. FIGS. 16-19 illustrate a modified closure assembly 150 for use with the threaded vial 10. The assembly 150 includes a lower cap 152 and an overcap 160, both of which are preferaby made from a deformable elastomeric material. As seen clearly in FIGS. 17 and 18, the cap 152 is generally cylindrical in configuration and includes a wide lower portion provided with threads 153. Further, the lower portion of the cap unit 152 includes a knurled surface 151 to facilitate the gripping of the cap. By this arrangement, the cap 152 can be readily threaded onto the vial 10 in engagement with the threads 14 to seal the mouth of the vial.

Figures 16, 17, 18, 19:
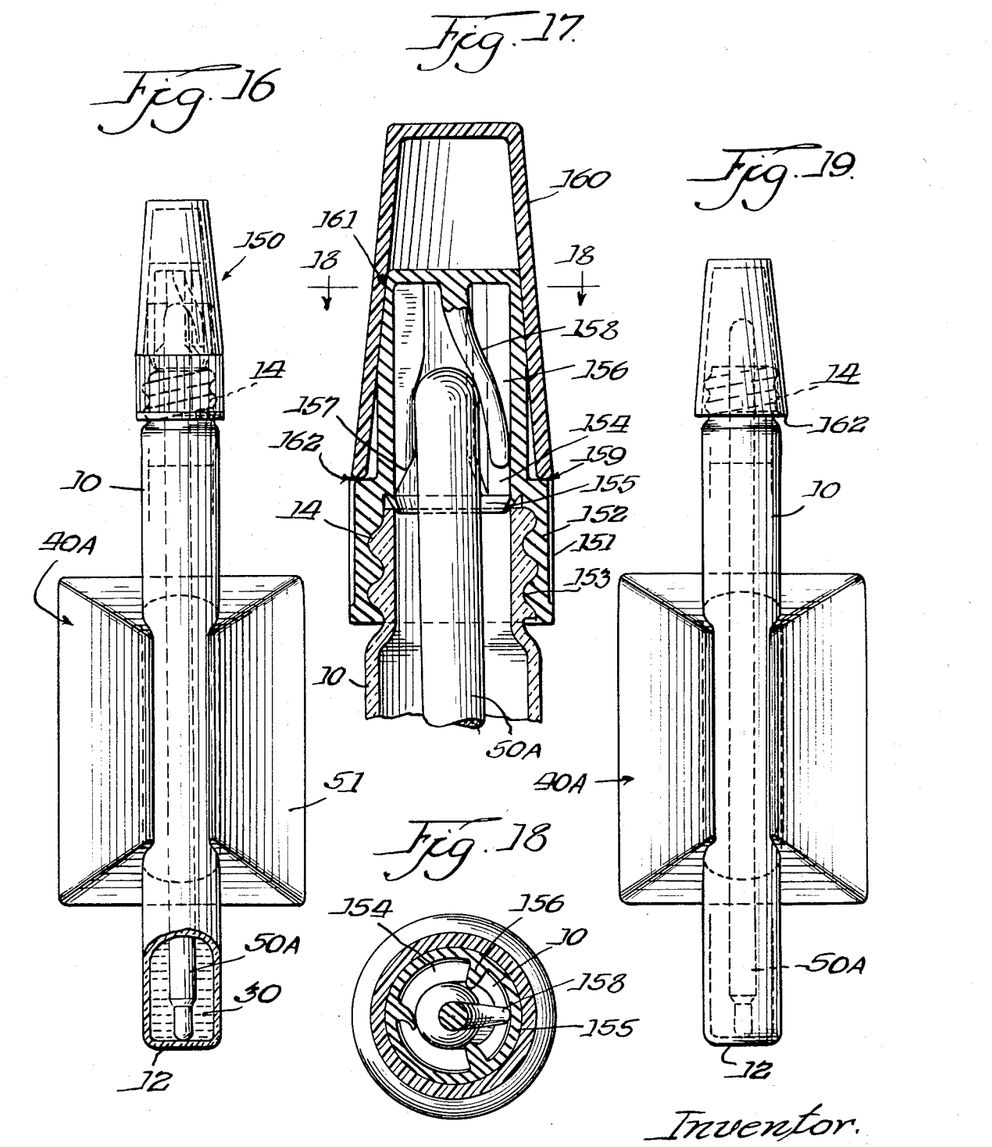
FIG. 16 is a front elevational view of the second embodiment of the system, illustrating a still further modification of the vial closure.
FIG. 17 is an enlarged cross-sectional view of the closure incorporated in the system shown in FIG. 16.
FIG. 18 is a cross-sectional view of the closure taken along the line 18—18 in FIG. 17.
FIG. 19 is a front elevational view of the system shown in FIGS. 16-18, illustrating the system after the vial seal is broken and the overcap is placed on the vial mouth.

As illustrated in FIGS. 16 and 17, the cap 152 defines an elongate recess 154 adapted to extend a predetermined distance above the open mouth of the vial 10 when the cap is placed on the vial. The recess 154 will thereby receive the upper end of the thermometer 50A when the cap 152 is secured to the vial 10. The cap 152 includes a resilient washer 155, formed integrally with the cap, for engaging with and sealing against the open mouth of the vial 10.

The cap 152 is further provided with means to secure the thermometer 50A from movement within the vial 10 during storage and shipment. To accomplish this, the cap 152 includes a plurality of deformable abutment members 156 which extend into the hollow recess 154 and which are adapted to engage with the top end of the thermometer 50A. As illustrated in FIG. 17, these abutments 156 are preferably formed integrally with the cap 152 and are spaced uniformly around the interior of the recess 154. The lower end of each of the abutments includes an upwardly beveled edge 157 for facilitating the entry of the upper end of the thermometer 50A into the recess 154.

In addition, the recess 154 includes a downwardly extending flexible finger 158 for engaging with the top of the thermometer 50A. This finger 158 like the abutments 156, is formed integrally with the cap 152 and extends downwardly for a predetermined distance from the top of the cap 152 into the center of the recess 154. Thus, the finger 158 will be engaged and be deflected by the upper end of the thermometer 50A when the cap 152 is threaded onto the vial 10. The finger 158 will thus wedge between the thermometer 50A and the interior walls of the cap 152 on one side of the thermometer and will force the opposed side of the thermometer against the opposed abutments 156. As seen in FIGS. 17 and 18, the abutments 156 and the finger 158 thereby cooperate to secure the thermometer 50A within the vial 10 and prevent any substantial movement of the thermometer in either a vertical or lateral direction. The exterior of the cap 152 is formed to define an annular shoulder 159, for receiving the bottom portion 162 of the overcap 160. In addition, as clearly indicated in FIG. 17, the upper portion 161 of the cap 152 is beveled inwardly to facilitate the placement of the overcap 160 over the top of the cap 152.

As illustrated in FIGS. 17 and 18, the overcap 160 has a hollow and generally conical configuration and is dimensioned to nest over the cap 152 with the lower portion 162 engaged on the shoulders 159 of the cap 152. This arrangement causes the overcap 160 to frictionally engage with the cap 152 at the beveled portion 161 of the cap 152.

To initiate the use of this second embodiment of the thermometer-handling system, as illustrated in FIGS. 11-19, the hospital or other medical institution is supplied with thermometer sets including the vials 10 or 10A, and an attaching means 40A. In this embodiment, each vial 10 or 10A is supplied with a measured volume of microbiocidal solution 30 and with a clinical thermometer 50 or 50A. The thermometer is immersed within the solution 30 in the vial and is secured in the vial by the cap assemblies 120, 130, 130A or 150.

When a thermometer 50 or 50A is to be dispensed to a patient, the attaching means 40A, such as the resilient body 51, is secured to the desired supporting surface in the manner described above. Then, one of the precharged vials 10 or 10A is inserted into the body 51 between the side arms 52, as illustrated in FIG. 11. In the preferred method, the cap is unsealed before the vial is placed in the body 51, and thereafter removed to expose the top of the thermometer. The thermometer is thereby supported in a convenient position, and is prepared for use without separate handling of the thermometers and vials.

Further, in the embodiments of the invention shown in FIGS. 15–19, having the overcaps 140 or 160, the lower cap portions 130A or 152 may be disgarded when the system is put into use. The overcaps 140 or 160 then can be used as a dust cover and placed over the open mouth of the vial 10, as clearly illustrated in FIG. 19. Thereafter, when the thermometer is to be used the overcap can be removed quickly from the vial, since the engagement between the overcap and the vial is frictional. This arrangement allows the thermometer 50 or 50A to be accessible to the patient or nurse, and the overcap 160 can be quickly replaced on the vial to protect the thermometer and the germicidal solution contained within the vial. The use of a separate overcap 140 or 160 also permits the overcap to be color-coded or provided with other suitable indicia to indicate the nature of the thermometer, such as oral or rectal, included in the vial.

Thus, when the thermometer-handling system in accordance with this invention is used, each patient can be provided with a sanitary and individualized thermometer which is maintained in a disinfected condition by the microbiocidal solution 30. Moreover, the thermometer is mounted and stored in disinfectant at a convenient location next to a patient's bed and does not have to be collected, disinfected, and then redistributed. Each of the thermometers 50 can thus be used personally by one patient and then can be disposed of, or taken home by the patient, when the patient is discharged. In addition to providing personalized thermometers, the present invention also allows the vials 10 or 10A to be personalized, so that no vial will be used with more than one thermometer or by more than one patient. After being used by a single patient, the vial 10 or 10A can be readily removed from the bracket 42 or 42A and disposed of when the patient is discharged. The vial also can be easily replaced by a fresh precharged vial at regularly specified intervals if the hospital stay of the patient is prolonged or if a substantial volume of the solution 30 is lost by evaporation. Accordingly, the amount of direct labor necessary to provide each patient with a personalized disinfected thermometer is significantly minimized because manpower is not required to collect, disinfect, and redistribute the thermometers. The need for changing or supplementing the charge of microbiocidal solution in each vial also is eliminated, since a spent vial can be readily replaced by a fresh precharged vial.

Further, since the vials are supplied with a measured amount of microbiocidal solution 30 contained therein, the solution can be charged into the vial on a mass-production basis in a manufacturing facility. Thus the volume of solution charged into the vial can be measured with great accuracy, and the charging can take place under closely controlled aseptic conditions. The vial can then be sealed with the cap 20 or 20A, and the solution kept in disinfected condition until the vial is used by a patient. The thermometer 50 also can be inserted into the vial under controlled aseptic conditions when the second embodiment of the system is employed. Then the closures 120, 130 or 140 can be placed on the vial to keep the solution 30 and thermometers 50 in a disinfected condition during storage and shipment.

It has been found that the microbiocidal solution 30 will work as an effective disinfectant for the thermometers immersed therein when the solution comprises any of the quaternary ammonium compounds such as dimethylbenzylammonium chloride, cetylpyridinium chloride, or cetyltrimethylammonium bromide; active iodine or any of the active iodine complexes such as polyvinylpyrollidone iodide; the alcoholic solutions such as 70 percent isopropanol or ethanol; the phenolic compounds such as o-chlorophenol; or the organic mercurial compounds such as phenylmercuric acetate. For example, the microbiocidal solution can comprise a solution of a quaternary compound such as bensalkonium chloride with a 50 percent ethanolic solution, or an iodine complex in a 50–70 percent alcoholic solution.

Although the invention has been described with a certain degree of particularity, it should be understood that the present disclosure has been made only by way of example. Consequently, changes in the details of construction and in the combination and arrangement of components, as well as the method of using the system, will be apparent to those familiar with the art and may be resorted to without departing from the spirit and scope of the invention as claimed.

What is claimed is:

1. A thermometer-handling system for providing an individualized thermometer and solution vial for retaining the thermometer in an aseptic condition comprising, in combination:
   an elongate clinical thermometer having a predetermined length and width;
   a sealed solution vial for receiving and supporting said thermometer, said vial having an open upper end through which said thermometer can be inserted and having a closed lower end adapted to support said thermometer within said vial, the length of said vial being less than the length of said thermometer so that the upper portion of said thermometer extends above said open upper end with the lower portion thereof supported by said bottom wall, said vial further being precharged with a measured volume of microbiocidal solution, with the volume of said solution being selected so that the insertion of said thermometer therein displaces said solution upwardly within said vial to a predetermined level below said open upper end and immerses the major length of said thermometer in said solution;
   removable closure means engaged with said open upper end of said vial to seal the interior of said vial and the charge of solution contained therein from the atmosphere and thereby retaining said solution in an aseptic condition; and
   means for releasably attaching said vial to a supporting surface, said attaching means including fastening means for mounting said attaching means on the supporting surface and further including gripping means for frictionally engaging with and releasably gripping the exterior of said vial.

2. A thermometer-handling system in accordance with claim 1 wherein said means for attaching said receptacle to a supporting surface comprises a spring clip having spring means adapted to releasably grip the exterior of said receptacle and further having adhesive fastening means engageable with said supporting surface.

3. A thermometer-handling system in accordance with Claim 1 wherein said means for releasably attaching said receptacle to a supporting surface comprises an integral body of flexible non-skid material having an elongate central bore adapted to grip the exterior of said receptacle along a substantial length of said receptacle, the front portion of said body defining a pair of elongate and resilient wings adapted to engage with and grip the exterior of said receptacle with said receptacle positioned within said bore, said wings defining an elongate opening there-between in communication with said bore through which said receptacle can be withdrawn from said bore, and wherein the back portion of said body includes a layer of adhesive material.

4. The invention in accordance with claim 1 wherein said closure means comprises a cap threadably engageable with said upper end of said receptacle.

5. A thermometer-handling system in accordance with claim 1 wherein said closure means comprises a deformable stopper frictionally engaged with the receptacle at said open upper end and wherein removable sealing means seals the juncture between said stopper and said open upper end of said receptacle.

6. A thermometer-handling system comprising in combination:
   A clinical thermometer having a pre-determined length and width;
   A hollow receptacle receiving and supporting said thermometer, said receptacle having an open upper end through which said thermometer can be inserted and having a closed lower end to support said thermometer within said receptacle, the length of said receptacle being less than the length of said thermometer so that the upper portion of said thermometer extends above said open upper end with the lower portion thereof supported by means of said bottom wall, said receptacle further being precharged with a measured volume of microbiocidal solution, with the volume of said solution being selected so that the insertion of said thermometer therein displaces said solution upwardly within said receptacle to a pre-determined level below said open upper end and immerses the major length of said thermometer in said solution;
   Means for releasably attaching said receptacle to a supporting surface, said attaching means including fastening means for mounting said attaching means on the supporting surface and further including gripping means for frictionally engaging with and releasably gripping the exterior of said receptacle; and
   Closure means engageable with said open upper end of said receptacle for sealing the interior of said receptacle and the charge of solution contained therein from the atmosphere, said closure means including an elongate hollow portion adopted to receive the upper portion of said thermometer and including a plurality of transverse abutment members formed integrally with said closure means and uniformly spaced within said hollow top portion, and further including flexible finger means extending downwardly from said closure top portion and adapted to deform transversely upon engagement with the upper portion of said thermometer, so said closure firmly grips the top portion of said thermometer, to maintain the thermometer from substantial movement within said receptacle.

7. A thermometer-handling system comprising; in combination:

A hollow receptacle for receiving and supporting said thermometer, said receptacle having an open upper end through which said thermometer can be inserted and having a closed lower end adapted to support said thermometer within said receptacle, the length of said receptacle being less than the length of said thermometer so that the upper portion of said thermometer extends above said open upper end with the lower portion thereof supported by said bottom wall, said receptacle further being pre-charged with a measured volume of microbiocidal solution, with the volume of said solution being selected so that the insertion of said thermometer therein displaces said solution upwardly within said receptacle to a predetermined level below said open upper end and immerses the major length of said thermometer in said solution;

means for releasably attaching said receptacle to a supporting surface, said attaching means including fastening means for mounting said attaching means on the supporting surface and further including gripping means for frictionally engaging with and releasably gripping the exterior of said receptacle;

an elongate clinical thermometer having a predetermined length and width and emplaced with said receptacle;

closure means engageable with the open upper end of said receptacle for sealing the interior of said receptacle and the charge of solution contained therein from the atmosphere, said closure means including a cap having a lower portion adapted to seal against the open upper end of said receptacle and defining an elongate hollow top portion adapted to receive the upper portion of said thermometer, said cap including deformable means projecting inwardly within said hollow top portion and adapted to firmly grip the upper portion of said thermometer to maintain said thermometer from substantial movement within said receptacle; and an over-cap frictionally engageable with the exterior of said cap and further adapted to extend over the upper portion of said thermometer and frictionally engage with the open upper end of said receptacle when said cap is removed therefrom, so that the over-cap functions as a temporary seal for said receptacle.

8. A thermometer-handling system in accordance with claim 7 wherein said overcap is coded with indicia which readily designates a selected characteristic of the thermometer retained within the associated vial.

9. A thermometer-handling system for providing an individualized thermometer and solution vial for retaining the thermometer in an aseptic condition comprising, in combination:

A sealed solution vial for receiving and supporting a thermometer, said vial having an open upper end through which a thermometer can be inserted and having a closed lower end adapted to support the thermometer;

an elongate clinical thermometer having a predetermined length and width and emplaced within said vial;

the length of said vial being less than the length of said thermometer so that the upper portion of said thermometer extends above said open upper end with the lower portion thereof supported by said bottom wall, said vial further being precharged with a measured volume of microbiocidal solution, with the volume of said solution being selected so that said thermometer emplaced therein displaces said solution upwardly within said vial to a predetermined level below said open upper end and immerses the major length of said thermometer in said solution;

hollow closure means releasably engaged with said open upper end of said vial and said upper portion of said thermometer and thereby sealing the interior of said vial and the charge of solution contained therein from the atmosphere and securing said thermometer from any substantial movement within said vial; and means for releasably attaching said vial to a supporting surface, said attaching means including fastening means for mounting said attaching means on the supporting surface and further including gripping means for frictionally engaging with and releasably gripping the exterior of said vial.

* * * * *